United States Patent [19]

Hans et al.

[11] 4,406,696

[45] Sep. 27, 1983

[54] PROCESS FOR RECOVERING OF METALS FROM SOLUTIONS OF METAL SALTS

[75] Inventors: Walter Hans, Kindberg/Aumühl; Hans D. Reiterer, Graz; Ernst Eichberger, Wels; Gerhard Lazar, Linz, all of Austria

[73] Assignee: Voest-Alpine Aktiengesellschaft, Vienna, Austria

[21] Appl. No.: 254,125

[22] Filed: Apr. 14, 1981

[51] Int. Cl.³ .............................................. C22B 15/00
[52] U.S. Cl. ..................................... 75/72; 75/97 R; 75/109
[58] Field of Search .............................. 75/97, 72, 109

[56] References Cited

U.S. PATENT DOCUMENTS

| | | | |
|---|---|---|---|
| 1,509,156 | 9/1924 | Lawry | 75/106 |
| 3,542,540 | 11/1970 | Heinen | 75/109 |
| 3,717,520 | 2/1973 | Brindisi | 75/97 R |
| 4,008,077 | 2/1977 | Wallace | 75/109 |

*Primary Examiner*—P. D. Rosenberg
*Attorney, Agent, or Firm*—Cushman, Darby & Cushman

[57] ABSTRACT

The process for recovering metals of the 1st, 2nd, 4th, 5th, 6th, 7th and 8th sub-group of the periodic law from solutions of their salts, particularly from solutions containing hydrochloric acid contemplates as the first process step a neutralization (1) for precipitating the metals from their acid metal salt solutions in the form of hydroxides or carbonates. The precipitate is pressed (4), and via conduits (9, 10) finally divided metal of the metal having been present as a salt as well as a carbon source originating of waste materials, particularly in form of ground heat setting synthetic plastics materials such as phenolic resins, amine formaldehyde resins, epoxide resins, polyesters, and also $CaCO_3$ is added. All components of this mixture must be used in a fine-grained state and preferably with a maximum particle size of 0.5 mm. Subsequently, the mixture is via a conduit (11) introduced into a reduction reactor (12) in which this mixture is mechanically agitated and heated to a temperature above the melting point of the metal in consideration for reducing the metal being present as a salt. For recovering the heat content of the effluent gasses as well as for purifying the effluent gasses, the effluent gasses formed during the reduction and containing CO and $CO_2$ are subjected to a post-combustion (15) and used for drying the pressed metal precipitate. The effluent gasses coming from the drying zone are washed (18), the washed water being preferably used for heating the metal salt solutions to be neutralized.

11 Claims, 1 Drawing Figure

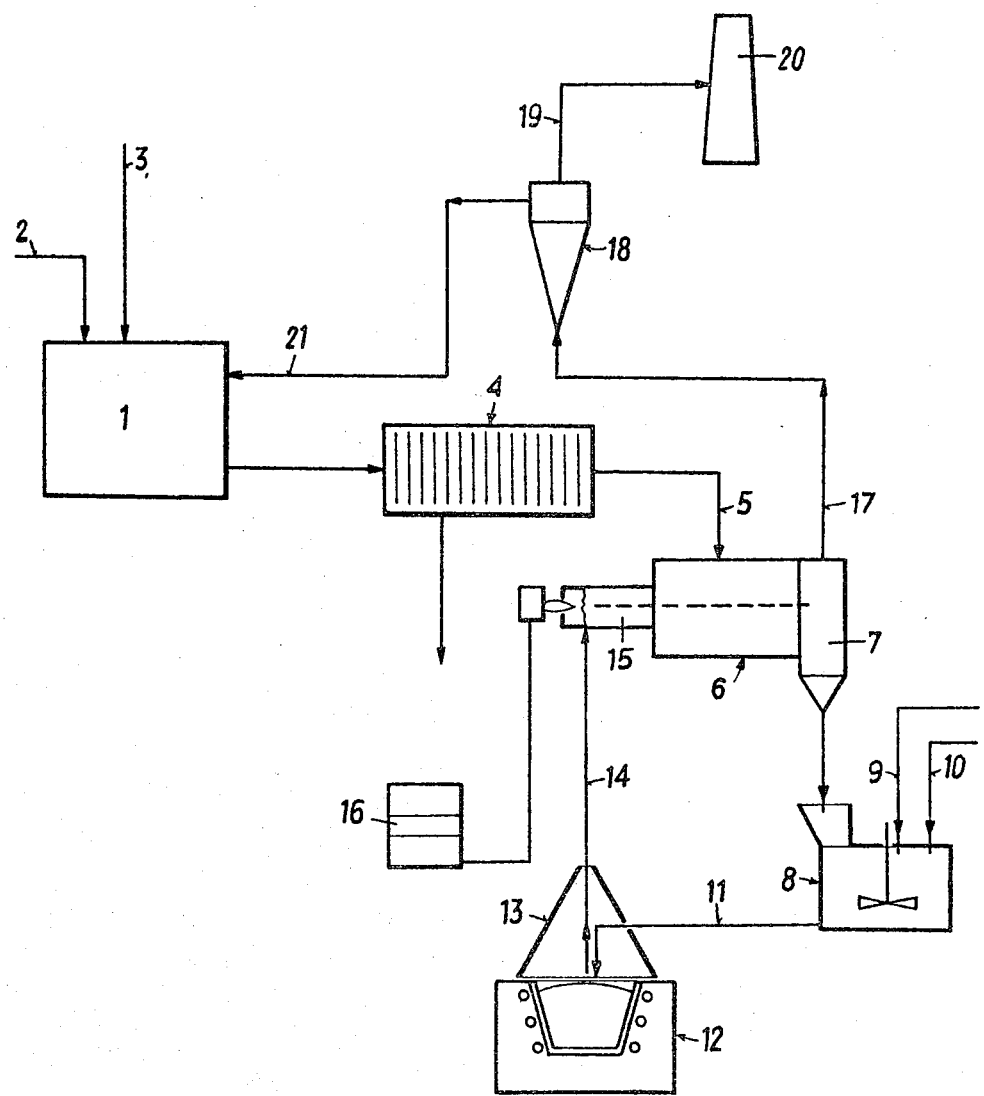

PROCESS FOR RECOVERING OF METALS FROM SOLUTIONS OF METAL SALTS

The invention refers to a process for recovering of metals of the 1st, 2nd, 4th, 5th, 6th, 7th and 8th subgroup of the periodic law from solutions of their salts, particularly from solutions containing hydrochloric acid. The metals of the mentioned sub-groups are characterized by forming more or less insoluble carbonates and, respectively, hydroxides or oxide hydrates and exist in a more or less great number of different valency stages. For recovering these metals from etching solutions for such metals and, respectively, of metals from spent pickling solutions as they are obtained, for example, in the printing circuitboard industry, there were already proposed several processes all of which required a great technical expenditure. Electrolytic recovering from the initially mentioned solutions of metal salts is made difficult by the more or less high concentration of chlorides to such an extent that it seems possible only when using expensive technological measures. In the case of acid solutions containing hydrochloric acid it is not possible to precipitate a precipitate free of chloride ion with metals of the initially mentioned type. In known processes for treating the initially mentioned solutions of salts, the solutions are neutralized by means of an aqueous solution of sodium hydroxide or sodium carbonate and/or by means of calcined limestone whereupon the precipitate formed is separated. The precipitate obtained from solutions of copper salts, which solutions are obtained when producing printed circuit boards or electronic components, can contain approximately 50 percent by weight of copper. In view of the pickling solutions used when producing printed circuit boards containing, as a rule, hydrogen peroxide and hydrochloric acid, also the copper precipitates obtained contain a more or less great amount of chloride ions.

For working up copper salts, particularly copper chloride, there has become known a process in which copper (II)-salts are reduced to copper(I)-salts by means of $SO_2$. The required equipment is expensive and, at any rate, not suitable to achieve quantitative conversions when making economic considerations.

$$2\ CuCl_2 + SO_2 + 2H_2O = 2CuCl + H_2SO_4 + 2HCl \quad (1)$$

According to a known proposal, the copper(I)-chloride formed in this manner was subsequently heated together with calcium carbonate or calcium oxide and coal or coke over extended periods of time to reduce copper(I) to metallic copper.

$$2CuCl + CaO + C = 2Cu + CaCl_2 + CO \quad (2)$$

$$2CuCl + CaCO_3 + C = 2Cu + CaCl_2 + CO_2 + CO \quad (3)$$

The invention now aims at providing a process for working up of metal salt solutions of the initially mentioned type and to make this process more simple and more rapid in operation. For solving this task, the invention essentially is characterized in that the acid metal salt solutions are neutralized for precipitating the metals as hydroxides or carbonates, in that subsequently, after compressing the precipitate, there is added finely divided metal of the metal present as a salt together with a carbon source originating of waste material, particularly in the form of ground thermosetting synthetic plastics material such as phenolic resins, amine formaldehyde resins, epoxide resins, polyesters, and together with $CaCO_3$, noting that all these components of the mixture are used in a finely particulate state and preferably with a maximum particle size of 0.5 mm, and in that this mixture is mechanically agitated and is, for reducing the salt of the metal present, heated to a temperature above the melting point of the respective metal. It is an essential feature of the process according to the invention that reduction to metal is effected in only one single process step from the oxydation number in which the metal is, during the neutralization step, precipitated as carbonate or oxide hydrate and hydroxide, respectively, on account of the finely divided reduced metal giving an autocatalytic effect in the sense of a reduction-oxydation-equilibrium. In this case, the solid materials, to be subjected to the reducing action, of the mixture are used in finely divided form of a preferred maximum particle size of 0.5 mm, particularly a maximum particle size of 0.1 to 0.2 mm, so that the reaction speed of the reaction between solid materials becomes substantially increased.

When working up solutions of copper salts obtained when etching printed circuit board, the neutralization step is preferably performed only with calcium carbonate having a maximum particle size of 0.5 mm, noting that the neutralization step is performed up to a maximum pH-value of 6. The reaction equations can be shown as follows.

$$3CuCl_2 + H_2O + 3CaCO_3 \rightarrow CuCl_2 \cdot Cu(OH)_2 \cdot CuCO_3 \cdot xH_2O + 2CaCl_2 + CO_2 \quad (4)$$

The precipitate obtained in this manner contains besides various amounts of chloride also lime stone not having been reacted. The preferred subsequent mode of operation consists in adding metallic copper as well as the carbon source in the form of finely ground punchings of printed circuit board, preferably in an amount of 10 to 30 percent by weight of the mixture to be reduced, and in effecting a heating step at temperatures of approximately 1100° C. for reducing the copper. Metallic copper is introduced by the punchings of the printing plates and this copper can react with the copper (II) as follows.

$$Cu(II) + Cu = 2Cu(I) \quad (5)$$

Printed circuit boards contain, as a rule, approximately 10 percent per weight of copper, based on the weight of printed circuit boards. The remaining 90 percent per weight are formed of synthetic plastics materials such as paper impregnated with phenolic resins, polyesters or the like. The synthetic plastics materials of printed circuit board waste are thermosetting synthetic plastics materials and can without further be finely ground. When grinding printed circuit board wastes it is simultaneously possible to incorporate in form of fine grains the copper layers bonded to these printed circuit boards so that the autocatalytic effect of the copper can be better enhanced. The organic portion of the printing plates can, after a carburization, be used as the carbon source, noting that the precipitate obtained in the neutralization step is thoroughly mixed with ground printed circuit board waste and lime stone and the mixture obtained is heated to a temperature of approximately 1100° C. in closed crucibles within a high temperature furnace, the processes according to the equations (2), (3) and (5) taking place simultaneously. The metallic copper accumulates on the bottom of the crucible and can easily be separated from the slag. For this purpose, during heating the mixture with simultaneous mechanical agitation, for instance within a rotary kiln, a reducing atmosphere containing CO and $CO_2$ is maintained.

According to the invention calcium carbonate is preferably added in an amount of 10 to 30 percent by weight to the mixture to be reduced, based on this mixture.

To make sure that the carbon source, being present particularly in printed circuit board in form of synthetic plastics material, be carburized, heating is preferably performed in two heating stages, noting that in a first heating stage the temperature is raised to 400° to 500° C. with a preferred heating speed of 10° to 20° C. per minute and in an immediately succeeding second heating stage the temperature is raised with a higher speed of preferably 20° to 30° C. per minute up to the melting point of the metal to be reduced. In the first heating stage the time interval required for decomposing the synthetic plastics material is reliably obtained by the lower heating speed. In the case of copper salts one can do without producing copper(I)-chloride and thus without an expensive and energy-consuming process step. Part of the energy required for the reduction is in this case supplied by carburizing the printed circuit board wastes. The process costs are substantially reduced by using lime stone which is required for the reduction process at any rate.

Because the salt solutions need not only be present as acid salt solution but are, for example in the printed circuit board manufacturing industry, also obtained in form of ammonical salt solutions (containing ammonium hydroxide), the acid salt solutions can, prior to being neutralized with $CaCO_3$, according to the invention, be added with alkaline and in particular ammonical salt solutions of the same metal to obtain a pH-value of maximally 3.5. In this manner acid and alcaline salt solutions can be worked up simultaneously.

With some of the initially mentioned metals one can not obtain a precipitate when effecting the neutralization step to obtain a pH-value of 6. Preferably and for example when precipitating nickel, the pH-value is brought to a value exceeding 7, particularly 7.5, after the neutralization step performed with $CaCO_3$.

For recovering the metals, most suitable are acid spent nickling solutions of the metals Ti, V, Cr, Mn, Fe, Co, Ni, Cu and Zn which are, if desired, added with alcaline or ammonical spent pickling solutions.

During the process of the invention effluent gasses containing CO, $CO_2$ and steam and having a temperature of 1200° to 1500° C. are generated within the reduction zone. These effluent gasses additionally contain gaseous compounds generated on incomplete combustion of, for example, synthetic plastics waste material serving as the carbon source, said compounds being in part aggressive and in part detrimental to the environment.

For better utilization of the heat content of the furnace waste gasses as well as for removing noxious matter from the waste gas, which is to be vented into the atmosphere in purified condition, and particularly for the purpose of recycling the heat recovered from the waste gasses of the reduction stage into the process and thus to use these waste gasses as process gasses, the process according to the invention is preferably performed such that the effluent gasses formed in the reduction zone and containing CO and $CO_2$ are subjected to a post-combustion step and are used in a subsequent drying zone for drying the pressed metal precipitate, whereupon the effluent gasses coming from the drying zone are purified in a washing zone and the wash water coming from the washing zone is, if desired, used for heating the metal salt solutions to be neutralized. Heating of the acid metal salt solutions to about 50° C. is, particularly when using lime stone in the neutralization step, of advantage for substantially reducing the neutralization time.

In the following the invention is further illustrated by examples of embodiment and with reference to the flow chart shown in the drawing.

The reaction mixture (precipitate obtained in the neutralization step, ground printed circuit board waste with a particle size of less than 1.5 mm, lime stone) was subjected in ceramic crucibles closed by a cover to a temperature of 1100° C. within a high temperature furnace, noting that the temperature was slowly raised up to complete carburization of the printed circuit board (card board impregnated with phenolic resin). After having reached a temperature of about 500° C. the temperature was rapidly raised to 1100° C. The following table shows the results of the tests for various mixing ratios and treating temperatures.

| Example No | parts by weight precipitate:printing-plate wastes:lime stone | temperature (°C.) | result |
| --- | --- | --- | --- |
| (1.) | 2:1:2 | 750 | formation of copper oxides, no reduction of the precipitate |
| (2.) | 2:1:1 | 750 | same result as in example 1 |
| (3.) | 4:1:1 | 750 | mixture of small copper spheres and copper oxides |
| (4.) | 2:1:1 | 1100 | better result than in example 3 |
| (5.) | 4:1:1 | 1100 | formation of great copper spheres |

The above tests showed that satisfactory results can only be obtained when working at a temperature just above the melting point of copper. In the following further examples, the amounts of the three components of the mixture were varied and the yield in metal was measured.

EXAMPLE 6

The charge used was a mixture of
10.0 g precipitate
3.01 g printed circuit board
3.08 g lime stone (98%)
After a treatment at a temperature of 1100° C. (one hour) there were obtained 3.99 g copper. This corresponds to a yield of approximately 75 to 80 percent.

EXAMPLE 7

The charge used was a mixture of
6.0 g precipitate
3.02 g printed circuit board
3.01 g lime stone (98%)
After a treatment at a temperature of 1100° C. (one hour) there were obtained 2.51 g copper. This corresponds to a yield of approximately 70 percent.

EXAMPLE 8

The charge used was a mixture of
5.0 g precipitate
3.98 g printed circuit board
2.0 g lime stone (98%)

After a treatment at a temperature of 1100° C. (one hour) there was obtained 0.57 g copper. This corresponds to a yield of approximately 20%.

EXAMPLE 9

The charge used was a mixture of
3.14 g precipitate
0.67 g printed circuit board
1.09 g lime stone (98%)

After a treatment at a temperature of 1100° C. (one hour) there were obtained 0.87 g copper. This corresponds to a yield of approximately 55 percent.

In the flow chart shown in the drawing, the neutralizing reactor is designated 1 and this reactor is charged with the acid metal salt solution and with the neutralizing agent via the conduits 2 and 3. The neutralizing reactor is maintained at a temperature of about 50° C. The precipitated metal compounds are pressed in a filter press 4 (chamber filter press) and the filter cake is fed via a conduit 5 to a drying equipment 6 which can be a drying drum. The dried metal compounds are fed via a separator 7 into a mixer 8 into which finely divided metal, for example copper, is fed via the conduit 9 and carbon sources and if desired fluxes such as $SiO_2$ or $CaF_2$ are fed via the conduit 10. The mixture is fed via the conduit 11 into the reduction reactor 12 which can be a crucible furnace. Reduction is effected within the reactor 12 under supply of heat, noting that the hot effluent gasses of the reactor are collected by the hood 13 and then passed via a conduit 14 into a combustion chamber 15 where the gasses are subjected to a post-combustion. Additional heat can be supplied to the combustion chamber 15 by burning fuel coming from a storage container 16. The gasses coming from the combustion chamber and being heated to a high temperature are supplied as a drying medium for the pressed metal precipitate into the drying equipment 6, the effluent gasses being cooled down to 200° to 300° C. during the drying period. The effluent gasses from the drying stage are passed via a conduit 17 into a washing equipment 18 which can be a venturi-washer. The purified waste gas flows via the conduit 19 into the chimney 20 while the warm wash water is fed via the conduit 21 to the neutralizing reactor and is used for heating, for example by means of heat exchangers, the metal salt solutions to be neutralized.

What is claimed is:

1. Process for recovering of metals of the 1st, 2nd, 4th, 5th, 6th, 7th and 8th sub-group of the periodic law from solutions of their salts comprising neutralizing the acid metal salt solutions for precipitating the metals as a precipitate of hydroxides or carbonates, compressing the precipitate, adding finely divided metal of the metal present as a salt together with a carbon source originating from waste material, together with $CaCO_3$, all these components of the mixture being used in a finely particulate state, mechanically agitating this mixture and, for reducing the salt of the metal present, heating to a temperature above the melting point of the respective metal.

2. Process as claimed in claim 1, characterized in that neutralization is effected with calcium carbonate having a maximum particle size of 0.5 mm, the neutralization step being performed up to maximum pH-value of 6.

3. Process as claimed in claim 2, characterized by adding metallic copper as well as the carbon source in an amount of 10 to 30 percent by weight of the mixture to be reduced, and in effecting a heating step at temperatures of approximately 1100° C. for reducing the copper.

4. Process as claimed in any of claims 1, 2 or 3, characterized in that during heating the mixture with simultaneous mechanical agitation, a reducing atmosphere containing CO and $CO_2$ is maintained.

5. Process as claimed in claim 1, characterized in that calcium carbonate is added in an amount of 10 to 30 percent by weight to the mixture to be reduced based on this mixture.

6. Process as claimed in claim 1, characterized in that heating is performed in two heating stages, in which in a first heating stage the temperature is raised to 400° to 500° C. with a heating speed of 10° to 20° C. per minute and in an immediately succeeding second heating stage the temperature is raised with a higher speed of 20° to 30° C. per minute up to the melting point of the metal to be reduced.

7. Process as claimed in claim 1, characterized in that the acid salt solutions are, prior to being neutralized with $CaCO_3$, added with alkaline salt solutions of the same metal to obtain a pH-value of maximally 3.5.

8. Process as claimed in claim 1, characterized in that when precipitating nickel, the pH-value is brought to a value exceeding 7 after the neutralization step performed with $CaCO_3$.

9. Process as claimed in claim 1, characterized in that for recovering purposes, acid spent pickling solutions are used after having been added with alkaline spent pickling solutions of the metals Ti, V, Cr, Mn, Fe, Co, Ni, Cu and Zn.

10. Process as claimed in claim 1, characterized in that the effluent gases formed in the reduction step and containing CO and $CO_2$ are subjected to a post-combustion step and are used in a subsequent drying zone for drying the pressed metal precipitate, whereupon the effluent gasses coming from the drying zone are purified in a washing zone and the wash water coming from the washing zone is used for heating the metal salt solutions to be neutralized.

11. Process as claimed in claim 1, characterized in that the carbon source is selected from the group consisting of ground thermosetting synthetic plastics material, phenolic resins, amine formaldehyde resins, epoxide resins, polyesters and finely ground punchings of printed circuit board.

* * * * *

UNITED STATES PATENT AND TRADEMARK OFFICE
CERTIFICATE OF CORRECTION

PATENT NO. : 4,406,696
DATED : September 27, 1983
INVENTOR(S) : Walter Hans, Hans Reiterer, Ernst Eichberger and Gerhard Lazar It is certified that error appears in the above—identified patent and that said Letters Patent is hereby corrected as shown below:

On the front page format, after paragraph "[21]", insert:  --[30]  Foreign Application Priority Data
            April 16, 1980    Austria..........A 2060/80
and      December 12, 1980   Austria.........A 6053/80--

Signed and Sealed this

Twentieth Day of March 1984

[SEAL]

*Attest:*

GERALD J. MOSSINGHOFF

*Attesting Officer*   *Commissioner of Patents and Trademarks*